United States Patent [19]
Lachelt et al.

[11] Patent Number: 6,148,338
[45] Date of Patent: Nov. 14, 2000

[54] SYSTEM FOR LOGGING AND ENABLING ORDERED RETRIEVAL OF MANAGEMENT EVENTS

[75] Inventors: David Jonathan Lachelt; Peter Thomas Houck, both of Fort Collins, Colo.

[73] Assignee: Hewlett-Packard Company, Palo Alto, Calif.

[21] Appl. No.: 09/055,057

[22] Filed: Apr. 3, 1998

[51] Int. Cl.[7] .......................... G06F 15/173; H05K 10/00
[52] U.S. Cl. .............................. 709/224; 714/47
[58] Field of Search .............................. 709/224; 714/39, 714/47

[56] References Cited

U.S. PATENT DOCUMENTS

| | | | |
|---|---|---|---|
| 5,032,979 | 7/1991 | Hecht et al. | 713/201 |
| 5,309,448 | 5/1994 | Bouloutas et al. | 714/25 |
| 5,317,742 | 5/1994 | Bapat | 709/300 |
| 5,627,886 | 5/1997 | Bowman | 379/111 |
| 5,655,081 | 8/1997 | Bonnell et al. | 709/202 |
| 5,740,432 | 4/1998 | Mastors | 707/202 |
| 5,751,933 | 5/1998 | Dev et al. | 714/47 |
| 5,752,247 | 5/1998 | Henderson | 707/102 |
| 5,787,437 | 7/1998 | Potterveld et al. | 707/103 |
| 5,796,633 | 8/1998 | Burgess et al. | 702/187 |
| 5,832,518 | 11/1998 | Mastors | 707/202 |
| 5,857,190 | 1/1999 | Brown | 707/10 |
| 5,881,315 | 3/1999 | Cohen | 710/52 |
| 5,896,440 | 4/1999 | Reed et al. | 379/1 |
| 5,978,475 | 11/1999 | Schneier et al. | 380/4 |
| 5,999,179 | 12/1999 | Kekic et al. | 345/349 |
| 5,999,978 | 12/1999 | Angal et al. | 709/229 |
| 6,000,045 | 12/1999 | Lewis | 714/47 |
| 6,006,016 | 12/1999 | Faigon et al. | 714/48 |
| 6,012,095 | 1/2000 | Thompson et al. | 709/231 |
| 6,012,152 | 1/2000 | Douik et al. | 714/26 |
| 6,018,567 | 1/2000 | Dulman | 379/34 |
| 6,038,563 | 3/2000 | Bapat et al. | 707/10 |
| 6,044,407 | 3/2000 | Jones et al. | 709/246 |
| 6,058,420 | 5/2000 | Davies | 709/224 |
| 6,061,723 | 5/2000 | Walker et al. | 709/224 |
| 6,078,649 | 6/2000 | Small et al. | 379/39 |

*Primary Examiner*—Zarni Maung
*Assistant Examiner*—Andrew Caldwell

[57] ABSTRACT

A methodology and supporting structure for logging and ordering management events in a network management system in a managed environment is presented. The network system has a central broker, which monitors the managed environment and receives events in the managed environment, and an event store, which has non-textual files organized into sets with each set containing corresponding event log and event index files. Events are logged as received by the central broker into the non-textual files organized into the sets. A complete representation of one or more events is stored in a language-independent form in an event log file of the event store so that the event information may be read and formatted for presentation in a local language. An event index file of the event log contains the location of the one or more events. The flow from multiple streams of related events may also be tracked.

26 Claims, 4 Drawing Sheets

SYSTEM FOR LOGGING AND ENABLING ORDERED RETRIEVAL OF MANAGEMENT EVENTS

FIELD OF THE INVENTION

The present invention relates generally to network management, and more particularly to a network system capable of logging and enabling the ordered retrieval of one or more events in a managed network environment.

BACKGROUND OF THE INVENTION

The Simple Network Management Protocol (SNMP) and Common Management Information Protocol (CMIP) are network management protocols that provide a generic mechanism by which different manufacturers' equipment can be monitored and controlled from a management system, such as a UNIX server. A network component on a managed network can be monitored and controlled using a management protocol to communicate management information between network components on the network. A network component includes networked personal computers, workstations, servers, routers, and bridges. There exist several key areas of network management including fault management, configuration management, security management, performance management, and accounting management. With the ability to instruct a network component to report events and the ability to start processes on a network component, the network an be manipulated to suit changing conditions within a system.

A key mechanism by which various network devices communicate with a management system is via SNMP traps or CMIP events. Hereafter "events" will be used to refer to either SNMP traps or CMIP events. Events allow for unsolicited notifications to be sent from one network device to another. This same mechanism can be used for communication between various cooperating software components within the management system. This form of communication is especially valuable when the information in the events might be of value to multiple consumers and the producer may be unaware of precisely who is interested in the information.

To facilitate the communication of these events between the various interested parties, a central broker may be provided which receives all such events from the producers and forwards them on to various parties that have registered their interest.

These events also have historical value when attempting to recreate and understand a problem scenario, typically in an effort to devise mechanisms to prevent such scenarios in the future. To this end, it is important to be able to log the events for later retrieval and then to be able to reconstruct the timeline of events.

In the prior art, events are received by a central broker referred to hereafter as the Postmaster Daemon (pmd). The pmd writes all events to a log file called trapd.log. The event data is written to trapd.log in a human readable ASCII textual fixed language format and contains a subset of the known information about an event. This trapd.log file is accessible by any event browser or other application that wishes to view or analyze the event data. The trapd.log file may be configured to grow until a maximum size, at which time the contents of the trapd.log file are moved to a backup file trapd.log.old and a new trapd.log file is generated for any new events. Since the event data written to trapd.log is written in an ASCII textual fixed language format, the event information cannot be easily reformatted into another language. Additionally, since trapd.log contains only a subset of the known information about the event, a significant portion of the data contained in the original event is lost when the event is stored. There is therefore an unmet need in the art to be able to store a complete representation of the original event information such that the entire event information may be retrieved. There is also an unmet need in the art to be store the original event information in a non-textual format that can be reformatted for presentation in a different local language.

Figure 1:
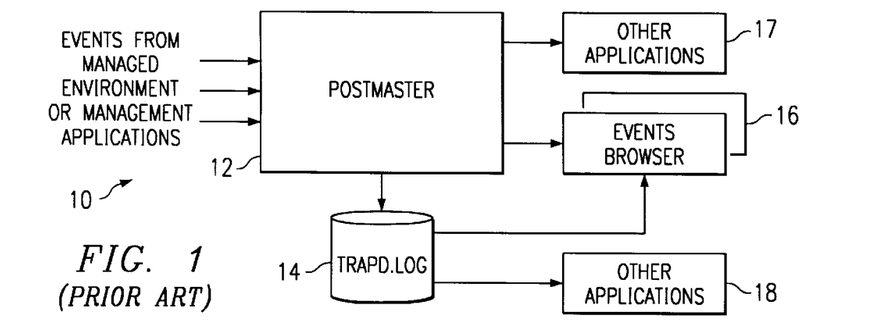
FIG. 1 illustrates a network system that utilizes a trapd.log file, according to the prior art.

Referring to FIG. 1, a network system 10 that utilizes a trapd.log file 14, according to the prior art, is shown. Postmaster Daemon 12 is responsible for receiving events from a managed environment or management applications and replicating the events simultaneously in ASCII text trapd.log file 14, event browsers 16, and other applications 17. Other applications 18 read the ASCII text trapd.log file 14.

A management activity may be interested in monitoring a subset of all of the events flowing through the Postmaster Daemon 12 which are in some way related to each other. Examples of such relatedness include the following: all of the events related to a particular application, device or network component; all of the events generated from devices of a particular manufacturer; and all of the events that were generated from a particular subset of the managed environment. The Postmaster Daemon 12 has the ability to allow the events flowing through the Postmaster Daemon 12 to be split into multiple groupings of related events hereafter referred to as streams of events, with each stream representing events related in some manner. Moreover, it is possible for a single event to be associated with more than one of these streams and for the ordering of events flowing through the multiple streams to vary from stream to stream. It is therefore important that the events flowing from each stream be recorded properly in the log file so that the flow from an individual stream can be reconstructed. However, the current trapd.log file is only suited to a single flow of events. There is therefore an unmet need in the art to be able to store event information from multiple streams such that the events are viewable and ordered by stream.

The Postmaster Daemon allows events to be correlated together. For instance, events indicating communication failures for several network components may collectively indicate a communication link has gone down. In the prior art, this correlation information is not recorded. There is therefore an unmet need in the art to be able to store event correlation relationship information.

SUMMARY OF THE INVENTION

It is therefore an object of the present invention to store a complete representation of each event received by the Postmaster Daemon in the order that it was received.

It is another object of the present invention to store the original event information in a non-textual format that can be selectively reformatted for presentation in a desired local language.

It is also an object of the present invention to allow the maximum size of the event log to be configured such that after the maximum size of the event log is reached, newer events replace the oldest events in the event log.

It is another object of the present invention to store information about the history of events flowing from individual streams while minimizing duplication of data and enabling rapid reconstruction of the stream history upon request.

It is yet another object of the present invention to record correlations between events such that events are recorded along with an identification of what kind of relationship exists between the events.

Therefore, according to the present invention, a complete representation of the management events received by the Postmaster Daemon is stored in an event store which replaces the ASCII file trapd.log of the prior art. To support backward compatibility, the Postmaster Daemon may be configured additionally to write to the ASCII trapd.log file, or a standalone application can generate a trapd.log file from a snapshot of the event store that contains the relevant contents of the event store at the moment that the snapshot was generated.

The event store is made up of a number of different non-textual files organized in sets. Each set contains an event log file and an event index file. Each set may also contain one or more stream log files and correlation log files. Events are written to the event log file and an entry is made in the event index file as soon as the Postmaster Daemon receives an event.

The event log file contains non-fixed size records, containing a timestamp of when the event was received and the complete event message. The event index file contains an index into the event log file searchable by a unique event identifier. The index entry contains the location of the event in the corresponding event log file.

A stream log file exists for each stream. A stream log file contains fixed length records containing a reference to an event which flowed from the stream and a timestamp of when the event left the stream. Events in the stream log are recorded in the order in which they left the stream.

A correlation log file may also be generated for each stream. A correlation log contains fixed-length records containing a relationship between a primary event and a correlated event. The correlation log is searchable by the event identifier of the primary event. Each record contains the identifier of the primary event and a reference to the correlated event.

BRIEF DESCRIPTION OF THE DRAWINGS

The novel features believed characteristic of the invention are set forth in the claims. The invention itself, however, as well as the preferred mode of use, and further objects and advantages thereof, will best be understood by reference to the following detailed description of an illustrative embodiment when read in conjunction with the accompanying drawing(s), wherein:

DESCRIPTION OF THE INVENTION

In the present invention a complete representation of management events received by the Postmaster Daemon is stored in a non-textual format, such as binary, event store. The event store replaces the ASCII text file trapd.log of the prior art. The event store contains the complete event data thereby allowing the entire event data to be read by an application. To support backward compatibility with the prior art ASCII trapd.log file, the Postmaster Daemon may be configured additionally to write to the trapd.log file.

The event store holds events in a language-independent form that enables formatting of events into a local language. An event browser may format the event information into a local language preferred by each user viewing the events.

The present invention provides for the logging of multiple streams of events in which a subset of all events can flow out of any particular stream in any arbitrary order and the same event may flow out of multiple streams. Events can be retrieved in the order in which they flowed from a given processing stream.

The present invention utilizes a single writer of events and allows multiple concurrent readers. The writer has the job of receiving events from various sources and logging them as quickly as possible. The present invention supports several basic access mechanisms by multiple readers, including: 1) sequential reading of all logged events in the order they were received; 2) sequential reading of all events that have flowed out of a specific stream; and 3) finding all events that have been correlated with a specific known event. The content and format of the various files has been designed to allow the writer and readers to interact with the files without the need for any locking of the event store files which would negatively impact the performance of the writer which tends to be a time critical component of such a network management system.

The event store is made up of a number of different files organized in sets. Each set contains an event log file and an event index file. Each set may also contain one or more stream log files and correlation log files. There are multiple sets of files. These sets of files are used in a circular fashion. As events are written to the event log file and the size of that file reaches a maximum configurable size, all of the files in the current set are closed and the next set of files is opened and truncated. Writing of events to the event store then continues to the files in the new set. When the last set is reached the system goes back to the first set. For illustrative purposes, four sets are used, but it will be understood by those skilled in the art that any number of sets may be utilized in the present invention.

Each file is written in a platform-independent form and contains a file header which indicates which type of file it is, the software version used to write the file, a set number indicating to which set it belongs, and an iteration number. The event log file contains non-fixed length records having a beginning-of-record marker, a timestamp, an iteration number, the length of the event message, the complete event message, and an end-of-record marker.

The event index file contains an index into the event log file. Entries in the event index file are indexed by an event identifier. Entries in the event index file contain the byte position in the event log file at which to find the event record. Events are appended to the event log file and an entry is written to the event index file as soon as the Postmaster Daemon receives the event. The event index file exists solely for use by the writer to enable the writer to find the location of a previously logged event. The location of an event is used when recording entries in the stream log file and the correlation log file. Logging the location of events in the stream log file and correlation log file avoids the need for a reader of these files to access the event index file which would require locking the event index file to avoid contention on that file.

For each stream configured in the Postmaster Daemon, a stream log file will be generated to note which events left the stream and at what time. Each record in a stream log is fixed-length and contains the following information: a timestamp; the set number of the event log file containing the event record; the location of the event record in the event log file; and an iteration number. The use of a stream log file allows the history of events flowing from individual streams to be stored while minimizing duplication of data and enabling rapid reconstruction of the stream history upon request.

For each stream there may also be a correlation log file that contains records with relationships between two events. A correlation log record is fixed-length and contains: the type of relationship between the two events; the event identifier of the primary event; the set number of the event log file containing the event record for the correlated event; the location of the correlated event in the event log file; and a timestamp of when the correlation was logged.

Each file in a set is named according to the type of file it is plus the corresponding set number. The stream log files and correlation log files are stream specific and are also named with the stream name.

Figure 2:
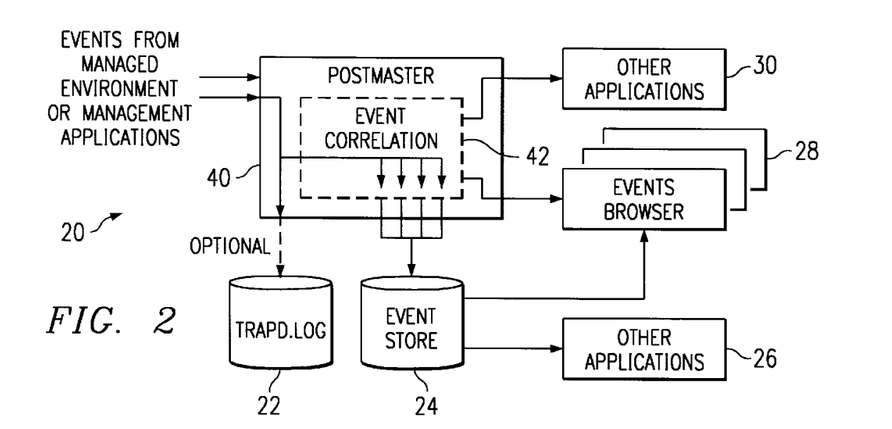
FIG. 2 illustrates a network system that includes an event store, according to the present invention.

Referring to FIG. 2, a network system 20 that includes an event store 24, according to the present invention, is shown. Postmaster Daemon 40 includes an event correlation 42 and is responsible for receiving events from a managed environment or management applications and replicating the events simultaneously in event store 24, event browsers 28, and other applications 30. Other applications 26 read event store 24. Optionally, Postmaster Daemon 40 may be configured to output to the ASCII text trapd.log file 22 of the prior art for backward compatibility with existing third party applications.

Figure 3:
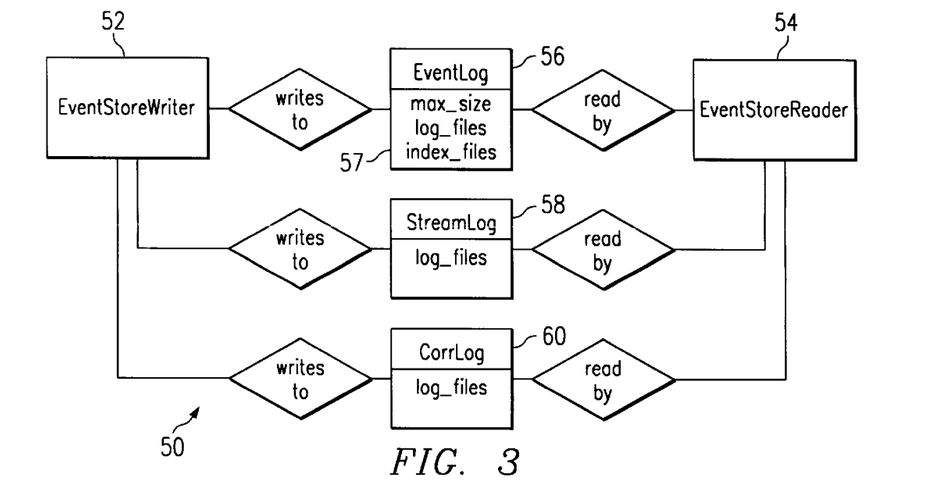
FIG. 3 illustrates an object model view of the event store writer and reader relationship to the event store files, according to the present invention.

Referring to FIG. 3, an object model view 50 of the event store writer and reader relationship to the event store files, according to the present invention, is shown. Events are written to the event log file EventLog 56 and an entry is written to the event index file event_index 57 by event store writer EventStoreWriter 52 as soon as the Postmaster Daemon receives the event. Event Store Writer EventStoreWriter 52 simultaneously writes to event log file EventLog 56 and event index file event_index 57. Event Store Writer EventStoreWriter 52 may generate stream log file StreamLog 58 for each stream that contains the location in the event log file of each event that has left the stream in the order that it has left the stream. EventStoreWriter 52 may also generate correlation log file CorrLog 60 that contains fixed-length records indicating a relationship between two events. Event Store Reader EventStoreReader 54, such as an event browser, may access event log file EventLog 56, stream log file StreamLog 58, and correlation log file CorrLog 60.

Figure 4:
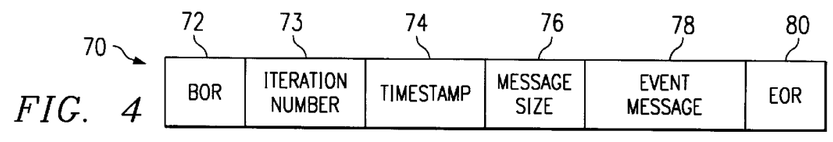
FIG. 4 illustrates the format of the event log file, according to the present invention.

Referring to FIG. 4, the format of the event log file, according to the present invention, is shown. Each event log file record 70 consists of six parts written in a platform-independent form containing a beginning-of-record marker BOR 72, an iteration number 73, a timestamp 74 of when the event was received, the length of the message "msg size" 76, the variable length event message 78 itself, and an end-of-record marker EOR 80. Beginning-of-record marker BOR 72 and end-of-record marker EOR 80 enable the file to be reliably scanned for events. Beginning-of-record marker BOR 72 and end-of-record marker EOR 80 contain a unique set of characters that identifies the start of a record and the end of a record, respectively, for instance "[({})]", and "{(☐)}".

The iteration number 73 is the iteration number the writer is currently using to write the event log file. This enables a reader to determine whether it has been "lapped" by the writer. This situation would occur if a reader began reading the file and paused, and then during the pause the writer truncated the file and began writing the new contents of the file beyond the point in the file at which the reader paused. The reader would recognize this by reading the next record and finding an invalid record or a record containing an iteration number which is different from that found in the file header when the reader began reading the file. The reader would then proceed to the next file.

Figure 5:
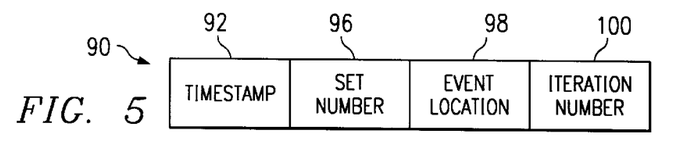
FIG. 5 illustrates the format of the stream log file, according to the present invention.

Referring to FIG. 5, the format of the stream log file, according to the present invention, is shown. Each stream log file record 90 contains a timestamp 92 of when the event left the stream, set number 96, the location of the event in the appropriate event log file "event location" 98, and iteration number 100. The appropriate event log file is indicated by set number 96. The location of the event in that event log file is indicated by event location 98. The iteration number 100 is the iteration number the writer is currently using to write the stream log file. It is used by the reader in the same fashion as that described in the event log file above.

Figure 6:
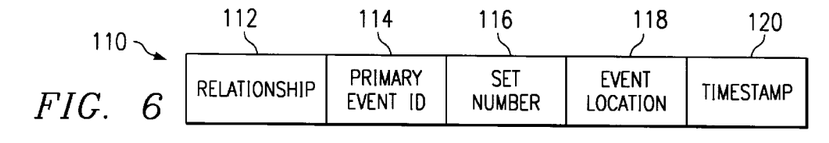
FIG. 6 illustrates the format of the correlation log file, according to the present invention.

Referring to FIG. 6, the format of the correlation log file, according to the present invention, is shown. Each correlation log file record 110 contains references to a pair of events in the event log files and a relationship between the events. Relationship 112 indicates the type of relationship between the events in the event log file. The primary event in the event log file is indicated by primary event identifier 114. The location of the correlated event in the event log is indicated by set number 116 of the event log file containing the event and the event location 118 in that file. Timestamp 120 indicates the time of the correlation.

Figure 7A:
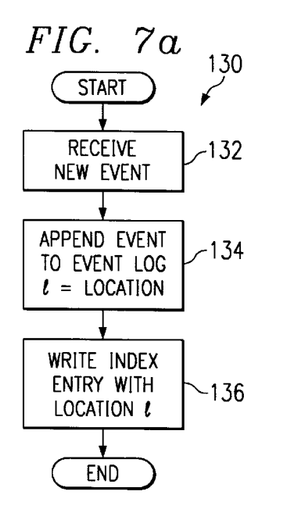
FIG. 7a illustrates a flow chart of the writer handling requests to log an event logic, according to the present invention.

Referring to FIG. 7a, a flow chart 130 of the writer handling requests to log an event, according to the present invention, is shown. An event enters the Postmaster Daemon and the entire event is appended to the event log file at an offset location "l" in the event log file, as illustrated at Blocks 132 and 134. An entry in the event index file is written indicating the location "l" of the event in the event log file, as illustrated at Block 136.

Figure 7B:
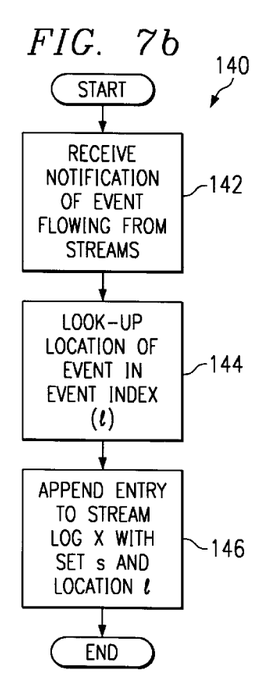
FIG. 7b illustrates a flow chart of writing a stream log entry, according to the present invention.

Referring to FIG. 7b, a flow chart 140 of writing a stream log entry, according to the present invention, is shown. The Postmaster Daemon receives notification of an event flowing from a stream "x", as illustrated at Block 142. The location "l" of the corresponding event in the event log file is determined by searching the event index files for the appropriate event, as illustrated at Block 144. An entry in the stream log file for stream "x" is written indicating set number "s" of the event log file in which the event is found and the location "l" of the event in the event log file, as illustrated at Block 146.

Figure 7C:
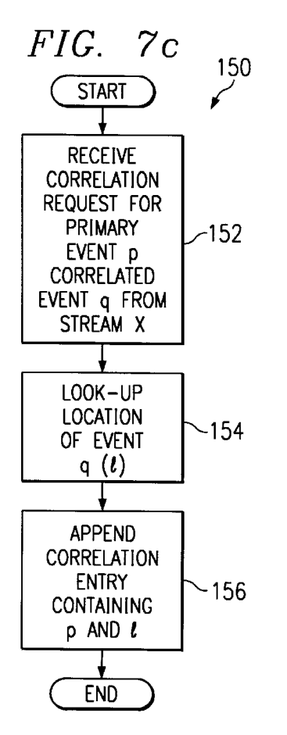
FIG. 7c illustrates a flow chart of writing a correlation log entry, according to the present invention.

Referring to FIG. 7c, a flow chart 150 of writing a correlation log entry, according to the present invention, is shown. The Postmaster Daemon receives a correlation request containing the primary event "p" and the correlated event "q", as illustrated at Block 152. The location "l" of the corresponding correlated event in the event log file is determined by searching the event index files for the appropriate event, as illustrated at Block 154. An entry in the correlation log file is written containing the primary event "p" and indicating the set number "s" of the event log file in which the event is found and the location "l" of the correlated event in the event log file, as illustrated at Block 156.

Figure 8:
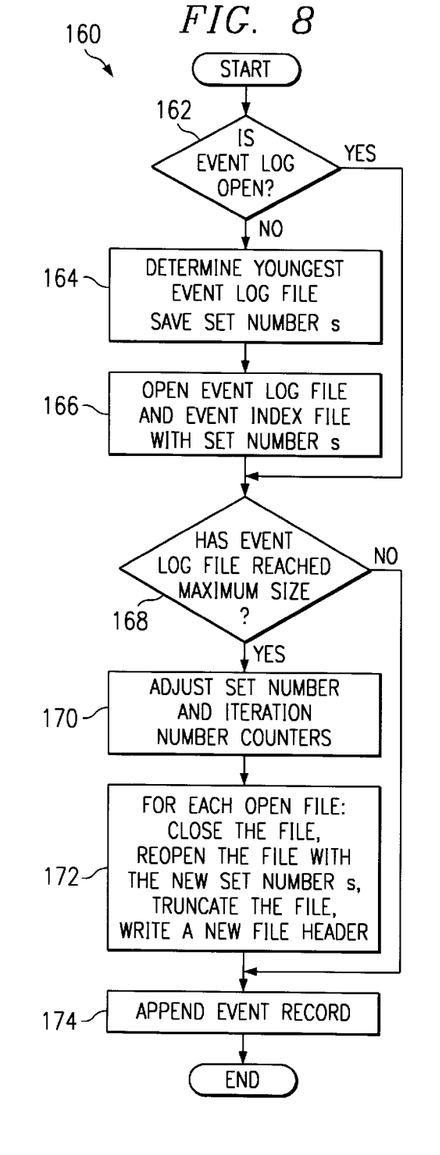
FIG. 8 illustrates a flow chart of appending entries to the event log, according to the present invention.

Referring to FIG. 8, flow chart 160 describes in detail Block 134 of FIG. 7a, appending entries to the event log, according to the present invention. At Decision Block 162, a determination is made as to whether the event log is open. If the event log is not open, then the flow continues with Block 164. Otherwise, if the event log is open, then the flow continues with Decision Block 168. As shown at Block 164, the writer determines the event log file containing the youngest events and saves the set number "s" of that file. One skilled in the art will recognize that this can be accomplished in a variety of ways, but it involves opening each file and reading the timestamp of the last event record in the file. As shown at Block 166, the event log file and event index file with set number "s" are opened and flow continues with Decision Block 168.

As shown at Decision Block 168, a determination is made as to whether the current size of the event log file has reached a configured maximum size that is configured at run time. If the event log file has not reached the maximum size, then flow continues at Block 174 and the event is appended to the event log file. Otherwise, if the event log file has reached the configured maximum size, then flow continues at Block 170. As shown at Block 170, the set number and iteration number counters are adjusted, as discussed in detail in FIG. 13, and flow continues at Block 172. At Block 172, for each file currently open by the writer, the following steps are performed: the file is closed; a file of the same type is opened with the new set number "s" and a similar stream name if applicable; the file is truncated; a new file header is written containing the new iteration number "i". Flow then continues at Block 174. One will readily recognize that the present invention is not limited to any specific number of sets of files for a series or to any specific iteration number.

Figure 13:
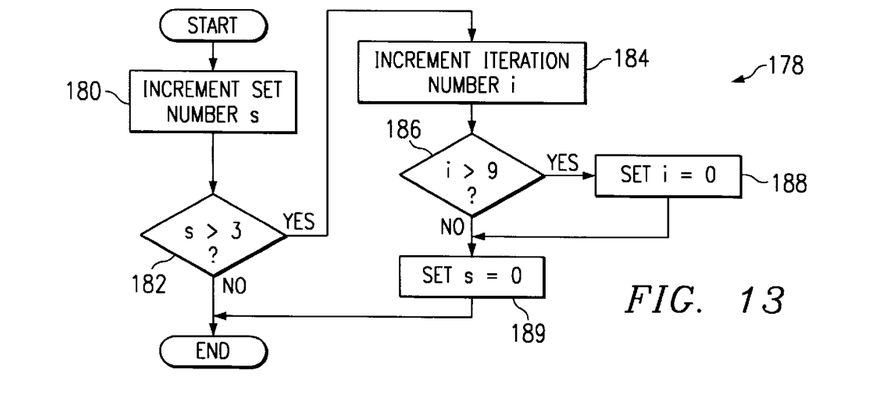
FIG. 13 illustrates a flow chart of Block 170 of FIG. 8, adjusting the set number and iteration number counters, according to the present invention.

Referring now to FIG. 13, flow chart 178 describes in detail Block 170 of FIG. 8, adjusting the set number and iteration number counters. At Block 180, the set number "s" is incremented and compared with the maximum set number as shown at Decision Block 182. If the maximum set number is exceeded, then flow continues at Block 184. The iteration number "i" is incremented and compared with the maximum iteration number, as shown at Block 184 and Decision Block 186. If the maximum iteration number is exceeded, then the iteration number "i" is reset to 0 as shown at Block 188 and flow continues with Block 189. Otherwise, if the maximum iteration is not reached, then flow continues with Block 189. At Block 189, the set number "s" is reset to 0.

While the flow shown and described in FIGS. 8 and 13 uses set numbers zero through three and iteration numbers zero through nine for demonstration purposes, the present invention is not limited to any specific number of sets of files for a series nor to any specific iteration number.

Figure 9:
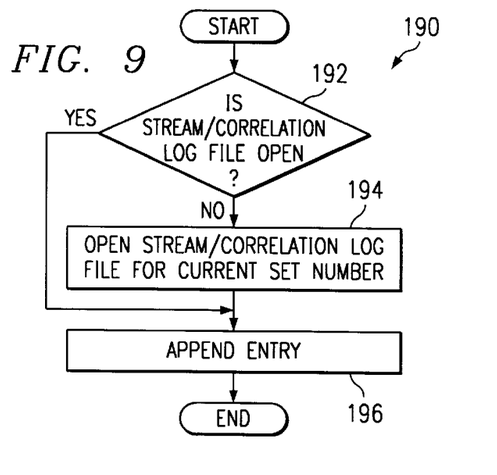
FIG. 9 illustrates a flow chart of appending entries to the stream log file or correlation log file, according to the present invention.

Referring to FIG. 9, a flow chart 190 describes in detail Blocks 146 and 156 of FIG. 7b and FIG. 7c, respectively, appending entries to the stream log file or correlation log file, according to the present invention. At Decision Block 192, the stream log file or correlation log file is checked to determine if it is currently open. If the stream log file or correlation log file is currently open, then flow continues to Block 198. Otherwise, if the stream log file or correlation log file is not currently open, then flow continues to Block 194. The current set number of the writer and the name of the stream are used to open the appropriate stream log file or correlation log file according to its set, as shown at Block 194. Finally, the stream or correlation information is appended to the open stream log file or correlation log file, as shown at Block 196.

Figure 10:
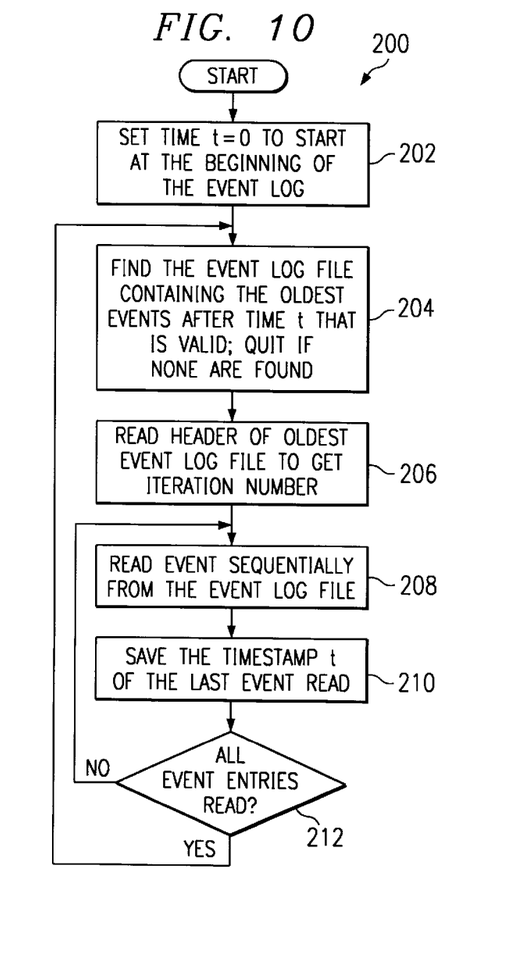
FIG. 10 illustrates a flow chart of reconstruction of the flow of events through the postmaster daemon by reading the event log files, according to the present invention.
Figures 11, 12:
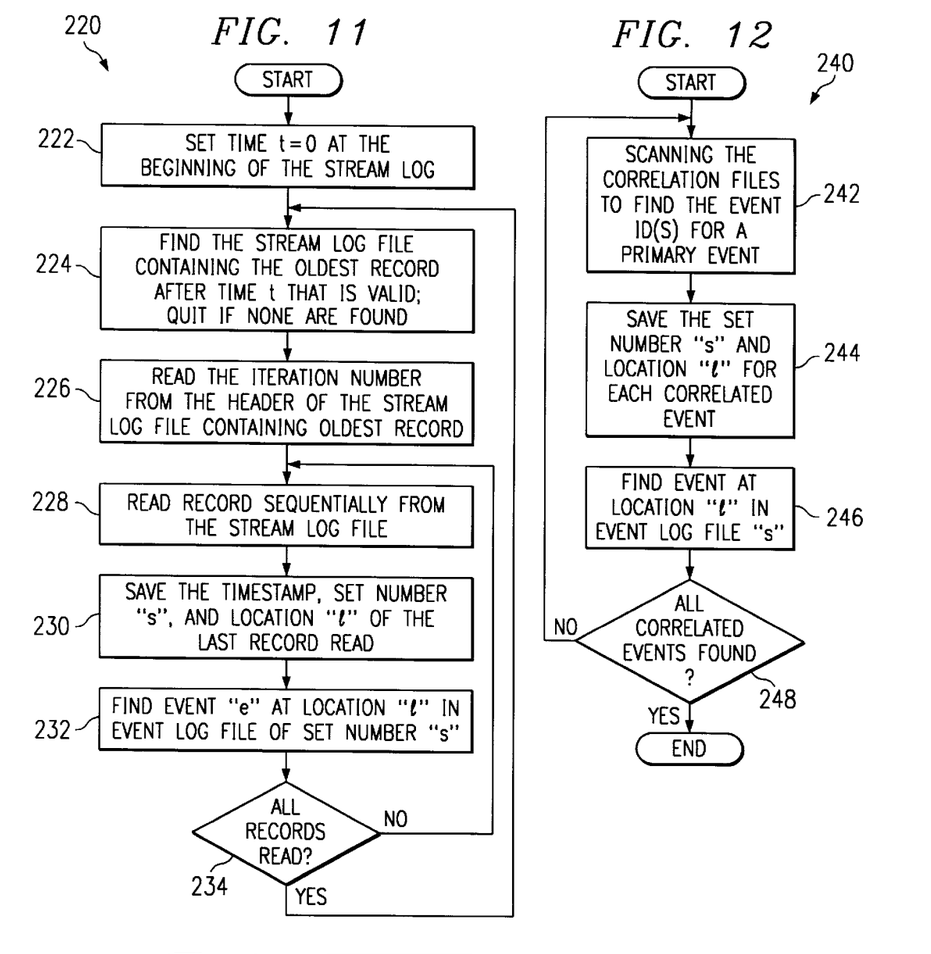
FIG. 11 illustrates a flow chart of reconstruction of the flow of events through a single stream of related events in the postmaster daemon by reading stream log files, according to the present invention.
FIG. 12 illustrates a flow chart for finding all events which have been correlated with a given event by reading the correlation log files, according to the present invention.

FIGS. 10–12 describe the reconstruction of the flow of events and correlation of events, according to the present invention. Referring now to FIG. 10, a flow chart 200 that illustrates the methodology of the present invention for reconstruction of the flow of events through the postmaster daemon by reading the event log files is shown. First, the time index is set to target time t=0 to mark the beginning of the event log as shown in Block 202. In Block 204 the reader then determines the proper file to begin with, the event log file containing the oldest events occurring after the target time established in Block 202. One skilled in the art will know there are various ways to determine the initial event log file. Each event log file must be opened and the timestamp of the first event of the file must be read to find the event log file having a first event with a timestamp that is minimally greater than the target time. Included in this step is the need to identify and eliminate any of the event log files that are corrupted. If all of the event log files contain events older than the target time, then the flow stops.

Once the initial event log file has been determined, the iteration number is read from the file header as shown in Block 206; the iteration number is illustrated as reference numeral 73 of FIG. 4. Next, as shown in Block 208, each event of the initial event log file is read sequentially from the file. Because the reader may be processing the event log files simultaneously with a writer, the reader must take care to recognize the occurrence of the writer modifying the file that the reader is currently reading. This situation may manifest itself by a read operation not completing properly, by a read operating resulting in an invalid event, or by a read operation yielding a valid event but the event containing an iteration number that is different from the iteration number read in the header when the file was opened in Block 206. If the read did not result in a valid event, the reader must assume that the file is corrupted or that the reader has been lapped by the writer; the flow must then proceed back to Block 204 to find an initial event log file that is not corrupted. Additionally, if the iteration number in the event record is not equal to the iteration number read in the header of the event log file in Block 206, the reader must again assume the file is corrupted or the reader has been lapped. The flow would then return to Block 204 to find an initial event log file that is not corrupted.

Assuming that the proper initial event log file has been identified, each event entry of the event log file is read sequentially in Block 208. After each event entry is read from the current event log, its timestamp t is saved prior to reading the next event entry of the event log file as shown in Block 210. Block 212 demonstrates that this process of reading the next event entry continues until all event entries of the event log file have been read. The reading process then continues with the logic at Block 204 to find the next event log file until all event entries of the log files have been read in sequential order.

Referring now to FIG. 11, a flow chart 220 that illustrates the methodology of the present invention for reconstruction of the flow of events through a single stream of related events in the postmaster daemon by reading stream log files is shown. First, the time index is set to target time t=0 to mark the beginning of the stream log as shown in Block 222. In Block 224 the writer then determines the proper file to begin with, which is the stream log file containing the oldest events occurring after the target time established in Block 222. One skilled in the art will know there are various ways to determine the initial stream log file. Each stream log file must be opened and the timestamp of the first record of the file must be read to find the stream log file having a first record with a timestamp that is minimally greater than the target time. Included in this step is the need to identify and eliminate any of the stream log files that are corrupted. If all of the stream log files contain records older than the target time, then the flow stops.

Once the initial stream log file has been determined, the iteration number is read from the file header as shown in Block 226; the iteration number is illustrated as reference numeral 100 of FIG. 5. Next, as shown in Block 228, each record of the initial stream log file is read sequentially from the file. Because the reader may be processing the stream log files simultaneously with a writer, the reader must take care to recognize the occurrence of the writer modifying the file that the reader is currently reading. This situation may manifest itself by a read operation not completing properly, by a read operating resulting in an invalid record, or by a read operation yielding a valid record but the record containing an iteration number that is different from the iteration number read in the header when the file was opened in Block 226. If the read did not result in a valid record, the reader must assume that the file is corrupted or that the reader has been lapped by the writer; the flow must then proceed back to Block 224 to find an initial stream log file that is not corrupted. Additionally, if the iteration number in the is not equal to the iteration number read in the header of the stream log file in Block 226, the reader must again assume the file is corrupted or the reader has been lapped. The flow would then return to Block 224 to find an initial stream log file that is not corrupted.

Assuming that the proper initial stream log file has been identified, each record of the stream log file is read sequentially in Block 228. As demonstrated at Block 230, the timestamp "t", set number "s", and location "l" of each valid record read are saved before proceeding to the next record. When a valid record is read, then the reader finds the actual event "e" at the given location "l" in the event log file indicated by the set number "s", as indicated at Block 232. Again, due to the possibility that the writer will be operating simultaneously with the reader, the event might not be found or the event found might have been logged after the stream log entry and thus would be considered invalid. In this case, the reader simply continues to the next record in the stream log file until a valid event is found.

Block 234 demonstrates that this process of reading the next event entry continues until all event entries of the stream log file have been read. The reading process then continues with the logic at Block 224 to find the next stream log file until all entries of the log files have been read in sequential order.

Referring to FIG. 12, a flow chart 240 that illustrates the methodology of the present invention for finding all events which have been correlated with a given event by reading the correlation log files is shown. The process of finding all correlated events that have been correlated with a given primary event begins with sequentially scanning the records of all the correlation log files looking for the given event id of the primary event, as shown in Block 242. Then, for each matching record found, the correlated, or secondary, event indicated by the set number and location number are read from the proper event log file as shown in Block 244. At Block 246, the event at location "l" and set number "s" previously saved are used to read the matching event.

Again, it is possible that the matching event will not be valid. This would occur due to the possibility of the writer operating simultaneously with the reader such that the event might not be found or the event found might have been logged after the correlation log entry and thus would be considered invalid. In this case, the reader simply continues scanning the next record in the correlation log. The flow in this case would return to Block 244 to save the set number "s" and the location number "l" of the next matching event. Upon finding the event, the correlated event is read. This process continues until all valid correlated events correlated with a primary event have been found and read.

The present invention provides several advantages over the prior art. The present invention provides an advantage over the prior art's limited event presentation. First, a complete representation of the original event information received by the Postmaster Daemon is written to the event store by the present invention. In the present invention, the event store contains the complete event data thereby allowing the entire event data to be read by a browser. Secondly, the present invention provides an advantage over the prior art's local language support. In the present invention, the original event information is written to the event store in a non-textual format that can be selectively reformatted for presentation in a different local language. Finally, the present invention provides an advantage over the prior art stream processing. The present invention associates events with a given stream such that events are viewable as multiple streams of events.

While the invention has been particularly shown and described with reference to a preferred embodiment, it will be understood by those skilled in the art that various changes in form and detail may be made therein without departing from the spirit and scope of the invention.

What is claimed is:

1. A method for logging events in a managed environment, said method comprising:

a) monitoring, by a central broker, the managed environment for one or more events;

b) receiving an event of the one or more events by the central broker;

c) logging the event as the event is received by the central broker to an event store, wherein the event store has a plurality of non-textual files organized into a plurality of sets with each set of the plurality of sets containing corresponding event log and event index files, by appending a complete representation of the event in a language-independent non-textual form to an event log file of the event store and writing to an event index file the location of the event in the event log file; and d) repeating b) and c) for each event of the one or more events.

2. The method of claim 1, wherein simultaneous with logging the event to the event store, also logging the event to an ASCII text file.

3. The method of claim 1, wherein the language-independent form enables formatting of each event of the one or more events into a local language.

4. The method of claim 1, wherein after receiving and logging the one or more events to the event store, logging the notification of an event flowing from a stream, said method comprising:

a) receiving notification of a stream event flowing from a stream;

b) determining the location of the stream event in the event log file; and c) logging the stream event to an event store by appending to a stream log file of one or more stream log files the location of the stream event in the event log file.

5. The method of claim 4, wherein determining the location of the stream event in the event log file is accomplished by reference to the event index file.

6. The method of claim 4, wherein appending to the stream log file the location of the stream event in the event log file further comprises:

a) determining whether the stream log file is open;

b) if the stream log file is not open, opening the stream log file and writing a stream log file header in the stream log file; and c) writing the location of the stream event to the stream log file.

7. The method of claim 6, wherein opening the stream log file is accomplished by opening the stream log file having a file name that contains a set number and a stream name of the stream event.

8. The method of claim 1, wherein after receiving and logging the one or more events to the event store logging a correlation request, said method comprising:

a) receiving a correlation request for a primary event and a correlated event;

b) determining the location of the correlated event in the event log file; and c) logging the correlated event to an event store by appending to a correlation log file the location of the correlated event in the event log file.

9. The method of claim 8, wherein determining the location of the correlated event in the event log file is accomplished by reference to the event index file.

10. The method of claim 8, wherein appending to the correlation log file the location of the correlated event in the event log file, further comprises:

a) determining whether the correlation log file is open;

b) if the correlation log file is not open, opening the correlation log file and writing a correlation log file header in the correlation log file; and c) writing the location of the correlated event to the correlation log file.

11. The method of claim 10, wherein opening the correlation log file is accomplished by opening the correlation log file having a file name that contains a set number and a stream name of the correlated event.

12. A method for logging events in a managed environment, said method comprising:

a) monitoring, by a central broker, the managed environment for one or more events;

b) receiving an event of the one or more events by the central broker;

c) logging the event as the event is received by the central broker to an event store by appending a complete representation of the event in a language-independent form to an event log file and writing to an event index file the location of the event in the event log file, wherein the event store has a plurality of non-textual files organized into a plurality of sets and, wherein appending a complete representation of the event to the event log file, further comprises:

determining whether the event log file is open;

if the event log file is not open, comprising:
determining a youngest event log file and saving a set number of the youngest event log file; and
opening the youngest event log file and the event index file having the set number;

determining whether the event log file has reached a maximum size;

if the event log file has reached the maximum size, comprising:
adjusting a set number counter and an iteration counter; and
for each open event log file, closing the event log file, reopening the event log file with a new set number, truncating the file, and writing a new file header of the event log file; and appending the event to the event log file; and d) repeating b) and c) for each event of the one or more events.

13. The method of claim 12, wherein opening the event log file and the event index file is accomplished by opening the event log file and one or more event index files having filenames that contain the set number.

14. The method of claim 13, wherein the event log file header contains the iteration number.

15. A method for reconstruction of the flow of all events through a managed environment, comprising:

a) establishing a target time representative of the beginning of the logging of the one or more events;

b) identifying an initial event log file of the one or more event log files that contains the oldest events with respect to the target time;

c) opening the initial event log file and reading the iteration number of a header of the initial event log file;

d) reading in sequential order each event entry of the initial event log file;

e) verifying that the iteration number in each event entry of the initial event log file matches the iteration number of the header of the initial event log file and saving a set number, a location, and a timestamp of each event entry of the initial event log file that is read;

f) identifying a subsequent event log file of the one or more event log files that contains the oldest event with respect to the timestamp;

g) opening a subsequent event log file of the one or more event log files and reading the iteration number of the header of the subsequent event log file;

h) reading in sequential order each event entry of the subsequent event log file; and i) verifying that the iteration number in each event entry of the subsequent event log file matches the iteration number of the header of the subsequent event log file and saving the set number, the location, and the timestamp of each event entry of the subsequent event log file that is read;

j) repeating f)–i) for each event log file of the one or more event log files.

16. A method for reconstruction of the flow of the one or more events from a single stream in the central broker by reading one or more stream log files comprises:

a) establishing a target time representative of the beginning of a stream;

b) identifying an initial stream log file of one or more stream log files that contains the oldest stream event with respect to the target time;

c) opening the initial stream log file and reading an iteration number of a header of the initial stream log file;

d) reading in sequential order each stream event record of the initial stream log file;

e) verifying that the iteration number in each stream event record of the initial stream log file matches the iteration number read in the header of the initial stream log file and saving a set number, a location, and a timestamp of each stream event record of the initial stream log file that is read;

f) finding a stream event in an event log file using the location and the set number;

g) identifying a subsequent stream log file of the one or more stream log files that contains the oldest stream event with respect to the timestamp;

h) opening the subsequent stream log file of the one or more stream log files and reading the iteration number of the header of the subsequent stream log file;

i) reading in sequential order each stream event record of the subsequent stream log file;

j) verifying that the iteration number in each stream event record of the subsequent stream log file matches the iteration number read in the header of the subsequent stream log file and saving the set number, the location, and the timestamp of each stream event record of the subsequent stream log file that is read;

k) finding the stream event in the event log file using the location and the set number; and l) repeating g)–j) for each stream log file of the one or more stream log files.

17. The method of claim 16, wherein reading in sequential order each stream event record of the initial stream log file comprises saving a stream event timestamp, a set number, and the location of each stream event record as it is read before proceeding to read a subsequent stream event record of the subsequent stream log file.

18. A method for finding all correlated events which have been correlated with one or more primary events by reading the one or more correlation log files, said method comprising:

a) scanning the correlation log file to find the correlated event correlated with the primary event;

b) saving the location and a set number of the correlated event;

c) finding the correlated event in an event log file using the location and the set number; and d) repeating a)–c) for each correlated event of the one or more correlated events correlated with the primary event.

19. A network system capable of logging and enabling the ordered retrieval of events in a managed environment, comprising:

a) a central broker which monitors the managed environment for one or more events and receives the one or more events; and b) an event store, having a plurality of non-textual files organized into a plurality of sets with each set of the plurality of sets containing corresponding event log and event index files, to which each event of the one or more events is logged as received by the central broker in the order received, wherein an event log file of the event store contains a complete representation of the one or more events received from the central broker in a language-independent form that enables formatting of the one or more events into a local language and further contains an event index file containing the location of the one or more events in the event log file.

20. The system of claim 19, wherein the event store further comprises a stream log file containing the location of events in the event log file.

21. The system of claim 20, wherein the stream log file contains one or more records having a timestamp, an event identifier, a set number, a stream event location, and an iteration number.

22. The system of claim 19, wherein the event store further comprises a correlation log file containing one or more correlation relationships between one or more pairs of events in the event log file.

23. The system of claim 22, wherein the correlation log file contains fixed-length records.

24. The system of claim 22, wherein the correlation log file contains one or more records having a correlation relationship, a primary event identifier, a set number, a correlation event location, and a timestamp.

25. The system of claim 19, wherein the event log file contains variable-length records identified by a beginning-of-record marker and an end-of-record marker.

26. The system of claim 25, wherein the event log file contains one or more records having an iteration number, a timestamp, a message length, and a variable-length message.

* * * * *